United States Patent
Lee et al.

(10) Patent No.: US 10,128,477 B2
(45) Date of Patent: Nov. 13, 2018

(54) CAP ASSEMBLY AND SECONDARY BATTERY INCLUDING THE SAME

(71) Applicant: SAMSUNG SDI CO., LTD., Yongin-si, Gyeonggi-do (KR)

(72) Inventors: Sanghyo Lee, Yongin-si (KR); Wonil Jung, Yongin-si (KR); Yoonchang Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 191 days.

(21) Appl. No.: 14/586,215

(22) Filed: Dec. 30, 2014

(65) Prior Publication Data

US 2015/0236317 A1   Aug. 20, 2015

(30) Foreign Application Priority Data

Feb. 20, 2014  (KR) .................. 10-2014-0019689

(51) Int. Cl.
  *H01M 2/04*    (2006.01)
  *H01M 2/12*    (2006.01)
  *H01M 10/05*   (2010.01)

(52) U.S. Cl.
  CPC ........... *H01M 2/1241* (2013.01); *H01M 2/04* (2013.01); *H01M 2/043* (2013.01);
  (Continued)

(58) Field of Classification Search
  CPC .... H01M 2/1241; H01M 2/04; H01M 2/0404; H01M 2/043; H01M 2/14; H01M 10/05;
  (Continued)

(56) References Cited

U.S. PATENT DOCUMENTS 6,497,978 B1 * 12/2002 Takada ................ H01M 2/1241
                                                    429/185
2003/0034758 A1 * 2/2003 Abe ...................... H01M 2/1241
                                                    320/147
(Continued)

FOREIGN PATENT DOCUMENTS

| KR | 10-0882916 B1 | 2/2009 |
| KR | 10-2009-0059844 | 6/2009 |
| KR | 10-2011-0057987 | 6/2011 |

OTHER PUBLICATIONS

EPO Search Report dated Jul. 8, 2015, for corresponding European Patent application 15151472.6, (4 pages).

(Continued)

*Primary Examiner* — Stephen J Yanchuk
(74) *Attorney, Agent, or Firm* — Lewis Roca Rothgerber Christie LLP

(57) ABSTRACT

A cap assembly includes a current interrupt portion; a cap-up electrically connected with the current interrupt portion; and a gasket fixing the current interrupt portion and the cap-up, wherein the current interrupt portion comprises a vent portion comprising a safety vent configured to fracture when a predetermined pressure is applied thereon, and a cap-down comprising at least one hole configured to allow gas to flow in a direction toward the cap-up; and wherein an overall area of the at least one hole is about 0.12% to about 1.61% of a cross-sectional area of the gasket based on an outer diameter of the gasket.

10 Claims, 6 Drawing Sheets

(52) U.S. Cl.
CPC ......... *H01M 2/0404* (2013.01); *H01M 10/05* (2013.01); *H01M 2200/20* (2013.01); *H01M 2220/20* (2013.01); *H01M 2220/30* (2013.01)

(58) Field of Classification Search
CPC ......... H01M 2220/20; H01M 2220/30; H01M 2200/20
See application file for complete search history.

(56) References Cited

U.S. PATENT DOCUMENTS

| | | |
|---|---|---|
| 2009/0061310 A1 | 3/2009 | Kim et al. |
| 2009/0148753 A1 | 6/2009 | Jeon |
| 2010/0136388 A1* | 6/2010 | Kim .................... H01M 2/1241 429/56 |
| 2011/0123853 A1 | 5/2011 | Kim |
| 2012/0077062 A1* | 3/2012 | Fuhr ................... H01M 2/1241 429/56 |
| 2014/0335389 A1* | 11/2014 | Takahata ............... H01M 2/345 429/61 |
| 2015/0236316 A1* | 8/2015 | Shimizu .............. H01M 2/1241 429/56 |

OTHER PUBLICATIONS

SIPO Office Action, with English translation, dated May 3, 2018, for corresponding Chinese Patent Application No. 201510075826.9 (17 pages).

\* cited by examiner

CAP ASSEMBLY AND SECONDARY BATTERY INCLUDING THE SAME

CROSS-REFERENCE TO RELATED APPLICATION

This application claims priority to and the benefit of Korean Patent Application No. 10-2014-0019689, filed on Feb. 20, 2014, in the Korean Intellectual Property Office, the disclosure of which is incorporated herein in its entirety by reference.

BACKGROUND

1. Field

One or more embodiments of the present invention relate to a cap assembly and a secondary battery including the same.

2. Description of the Related Art

Unlike a primary battery that cannot be recharged, a secondary battery, which may be repeatedly charged and discharged, is economically advantageous and environmentally-friendly, and thus, is useful in many devices.

A secondary battery may be used as a single battery or a plurality of batteries may be electrically connected with one another, depending on the types of electronic devices using such a power source. For example, small devices, such as cellular phones, are capable of operating during a predetermined time by using only one secondary battery having a small output and capacity. However, devices requiring a larger output and capacity, such as electric cars, may use a battery pack in which a plurality of secondary batteries are connected in series, parallel, or series-parallel.

Because secondary batteries include a highly responsive material, the stability of the secondary batteries has been sought.

SUMMARY

One or more embodiments of the present invention include a cap assembly and a secondary battery including the same.

Additional aspects will be set forth in part in the description which follows and, in part, will be apparent from the description.

According to one or more embodiments of the present invention, a cap assembly includes a current interrupt portion, a cap-up electrically connected with the current interrupt portion, and a gasket fixing the current interrupt portion and the cap-up, wherein the current interrupt portion includes a vent portion including a safety vent formed such that at least a portion thereof is fractured when a pressure is applied thereon, and a cap-down including at least one hole through which gas flows in a direction toward the cap-up; and an overall area of the at least one hole is about 0.12% to about 1.61% of a cross-sectional area of the gasket based on an outer diameter of the gasket.

The cap-down may include an opening in a center thereof, the current interrupt portion may further include a sub-disk covering the opening, and the sub-disk and the vent portion may be electrically connected with each other in the opening.

The cap-down and the sub-disk may be integrally formed.

The cap assembly may further include an insulator in an edge between the cap-down and the vent portion, and a gap may be formed between the cap-down and the vent portion by the insulator.

The cap-down may include a first lower plate that is molded, a first upper plate that is molded and disposed to be spaced apart from the first lower plate, and a plurality of first bridge portions connecting the first lower plate and the first upper plate, wherein spaces between the plurality of first bridge portions that are adjacent to each other may sealed by the insulator.

The cap-down may include a plurality of holes arranged in a radial shape, each of the holes being at the same distance apart from the center of the cap-down.

Distances between two adjacent holes may be the same.

The cap-down may include two through six holes.

The hole may have a circular shape.

The cap assembly may further include an insulator between the cap-down and the vent portion, wherein the insulator may cover up the outside edge of the current interrupt portion.

The cap assembly may further include a cover plate that covers the insulator and includes a fluid hole through which gas flows in the direction toward the cap-up.

An area of the fluid hole may be 10 mm$^2$ or less.

The cap-up may include a second lower plate, a second upper plate, and a plurality of second bridge portions connecting the second lower plate and the second upper plate, and a notch may be formed in connecting portions of the plurality of second bridge portions, connected with the second lower plate and the second upper plate.

According to one or more embodiments of the present invention, a secondary battery includes an electrode assembly, a can containing the electrode assembly, and a cap assembly combined with a side of the cap, the cap assembly including: a current interrupt portion, a cap-up electrically connected with the current interrupt portion, and a gasket fixing the current interrupt portion and the cap-up, wherein the current interrupt portion includes a vent portion including a safety vent formed such that at least a portion thereof is open when an internal pressure of the can rises, and a cap-down including at least one hole through which gas generated inside the can flows in a direction toward the cap-up; and an overall area of the at least one hole is about 0.12% to about 1.61% of a cross-sectional area of the can based on an inner diameter of the can.

The cap-down may include an opening in a center thereof, the current interrupt portion may further include a sub-disk covering the opening, and the sub-disk and the vent portion may be electrically connected with each other in the opening.

The cap-down and the sub-disk may be integrally formed.

The secondary battery may further include an insulator in an edge between the cap-down and the vent portion, and a gap may be formed between the cap-down and the vent portion by the insulator.

The cap-down may include a first lower plate that is molded, a first upper plate that is molded and disposed to be spaced apart from the first lower plate, and a plurality of first bridge portions connecting the first lower plate and the first upper plate, wherein spaces between the plurality of first bridge portions that are adjacent to each other may be sealed by the insulator.

The cap-down may include a plurality of holes that may be arranged in a radial shape, each of the holes being at the same distance apart from the center of the cap-down.

Distances between two adjacent holes may be the same.

The cap-down may include two through six holes.

The hole may have a circular shape.

The secondary battery may further include an insulator between the cap-down and the vent portion, and the insulator may cover the outside edge of the current interrupt portion.

The secondary battery may further include a cover plate that covers the insulator and includes a fluid hole through which gas flows in the direction toward the cap-up.

An area of the fluid hole may be 10 mm$^2$ or less.

The cap-up may include a second lower plate, a second upper plate, and a plurality of second bridge portions connecting the second lower plate and the second upper plate, and a notch may be formed in connecting portions of the plurality of second bridge portions, connected with the second lower plate and the second upper plate.

A lower safety vent may be formed in a bottom surface of the can.

An upper safety vent and the lower safety vent may be fractured together when an internal pressure of the can exceeds a predetermined value.

The electrode assembly may have a jelly-roll shape and include a first electrode plate, a second electrode plate, and a separator between the first electrode plate and the second electrode plate. The electrode assembly may have a hollow in a center thereof. The first electrode plate may be electrically connected to the current interrupt portion and a first electrode tab, and the second electrode plate may be electrically connected to the can by a second electrode tab.

A first insulating plate and a second insulating plate may be respectively located on an end and other end of the electrode assembly.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
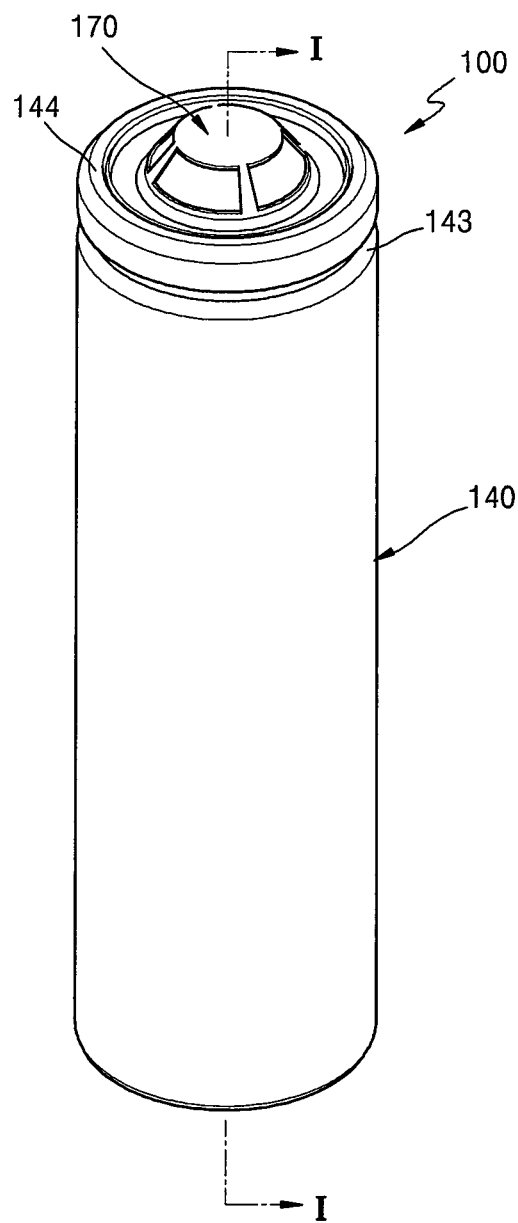
FIG. 1 is a schematic perspective view of a secondary battery according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that although the terms "first", "second", etc. may be used herein to describe various components, these components should not be limited by these terms. These components are only used to distinguish one component from another.

The terminology used herein is for describing particular embodiments and is not intended to be limiting of exemplary embodiments. As used herein, the singular forms "a," "an," and "the" are intended to include the plural forms as well, unless the context clearly displays otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, one or more embodiments of the present invention will be described more fully with reference to the accompanying drawings.

Figure 2:
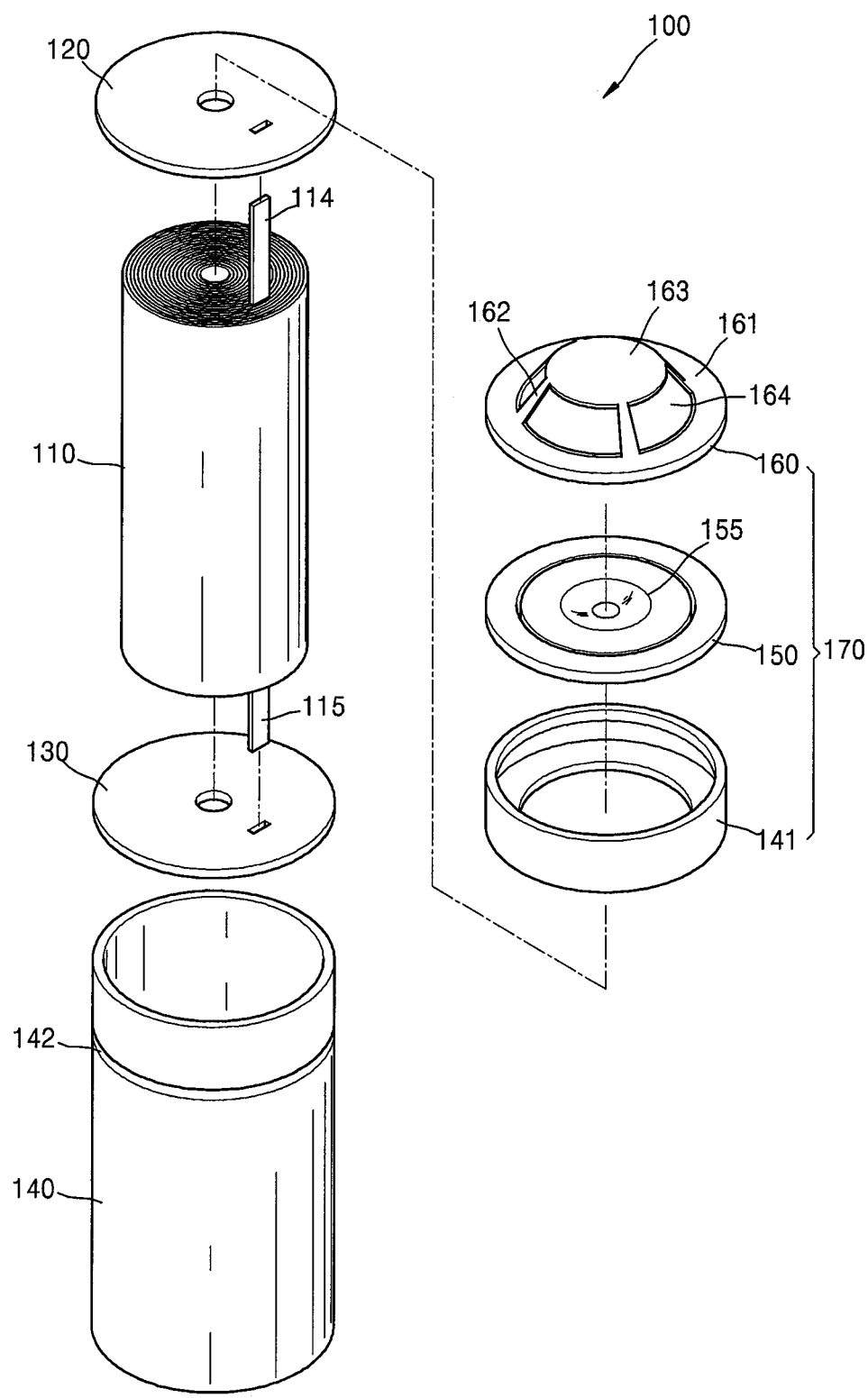
FIG. 2 is a schematic exploded perspective view of the secondary battery of FIG. 1.
Figure 3:
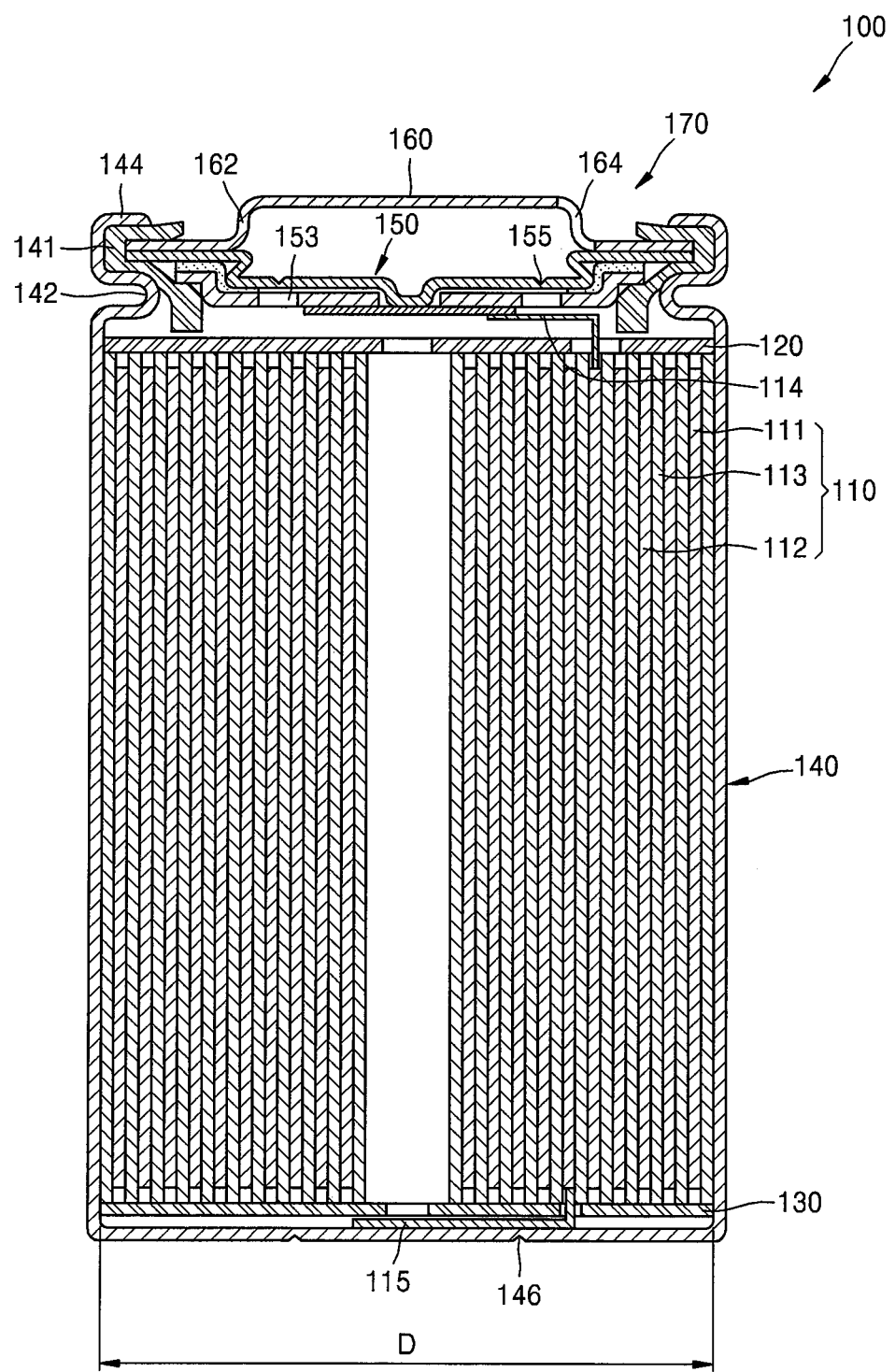
FIG. 3 is a schematic cross-sectional view taken along line I-I of FIG. 1.
Figure 4:
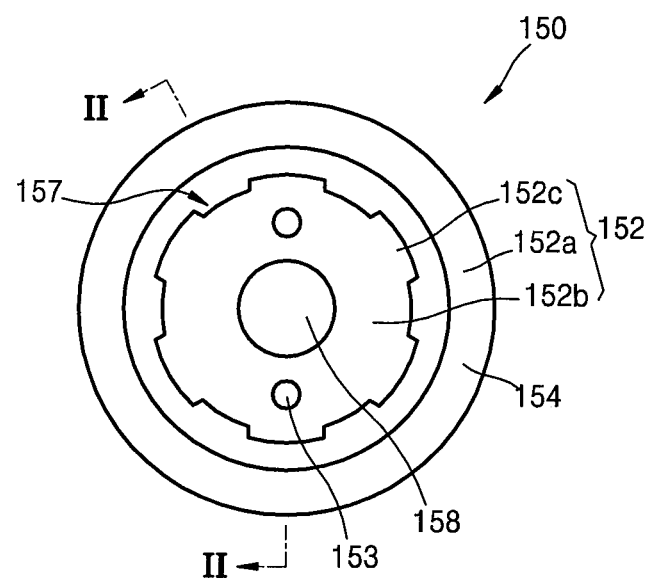
FIG. 4 is a schematic plan view of an example of a current interrupt portion of FIG. 2.
Figure 5:
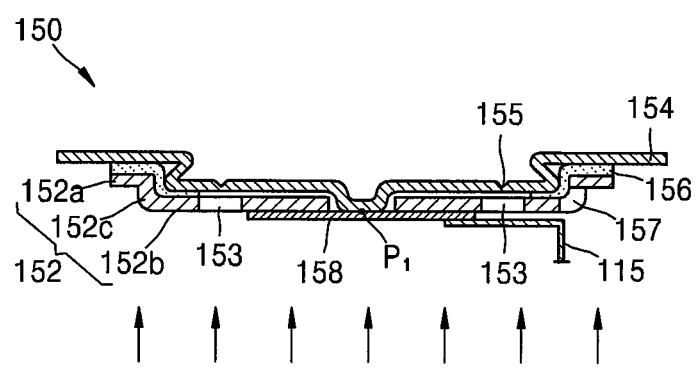
FIG. 5 is a schematic cross-sectional view taken along line II-II of FIG. 4.
Figure 6:
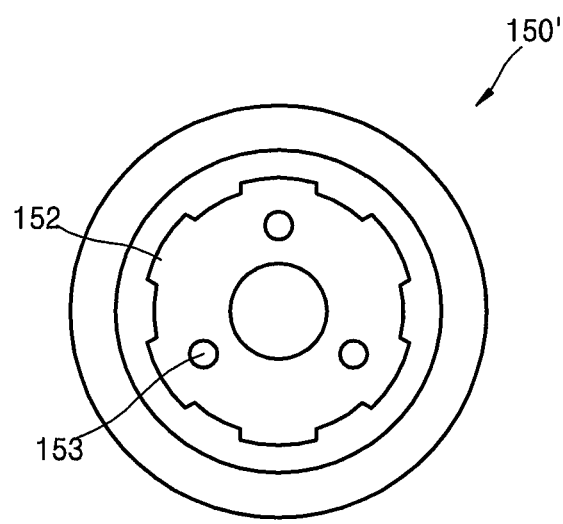
FIG. 6 is a schematic plan view of another example of a current interrupt portion of FIG. 2.

FIG. 1 is a schematic perspective view of a secondary battery 100 according to an embodiment of the present invention. FIG. 2 is a schematic exploded perspective view of the secondary battery 100 of FIG. 1. FIG. 3 is a schematic cross-sectional view taken along line I-I of FIG. 1. FIG. 4 is a schematic plan view of an example of a current interrupt portion 150 of FIG. 2. FIG. 5 is a schematic cross-sectional view taken along line II-II of FIG. 4. FIG. 6 is a schematic plan view of another example of the current interrupt portion 150 of FIG. 2.

Referring to FIGS. 1 through 5, the secondary battery 100 according to the present embodiments may include an electrode assembly 110, a can 140 containing the electrode assembly 110, and a cap assembly 170 combined with a side of the can 140.

The electrode assembly 110 may include a first electrode plate 111, a second electrode plate 112, and a separator between the first electrode plate 111 and the second electrode plate 112. For example, the electrode assembly 110 may be manufactured by sequentially stacking the first electrode plate 111, the separator 113, and the second electrode plate 112, and winding the first electrode plate 111, the separator 113, and the second electrode plate 112 to make a jelly-roll shape. In this case, a hollow is formed in the center of the electrode assembly 110 so that a passage through which gas inside the can 140 moves in up and down directions may be provided.

The first electrode plate 111 may be a positive electrode film or a negative electrode film. When the first electrode plate 111 is a positive electrode film, the second electrode plate 112 may be a negative electrode film. On the contrary, when the first electrode plate 111 is a negative electrode film, the second electrode plate 112 may be a positive electrode film. In other words, the first electrode plate 111 and the second electrode plate 112 are formed to have different electrical polarities, and are not limited to specific electrical polarities. However, hereinafter, for convenience of explanation, description will be provided with reference to a case in which the first electrode plate 111 is a positive electrode film, and the second electrode plate 112 is a negative electrode film.

The first electrode plate 111 may include a first active material portion coated with a first active material and a first non-coated portion that is not coated with the first active material. The first active material portion may be formed, for example, by coating a portion of at least one surface of an aluminum (Al) plate with the first active material, and, the rest of the Al plate, which is not coated with the first active material, may be the first non-coated portion. The first active material may be a positive electrode active material, such as lithium (Li)-containing transition metal oxide, such as $LiCoO_2$, $LiNiO_2$, $LiMnO_2$, and $LiMnO4$, or a Li chalcogenide compound.

The second electrode plate 112 may include a second active material portion coated with a second active material and a second non-coated portion that is not coated with the second active material. The second active material portion may be formed, for example, by coating a portion of at least one surface of a copper (Cu) plate with the second active material, and, the rest of the Cu plate, which is not coated with the second active material, may be the second non-coated portion. The second active material may be for example a negative electrode active material. In particular, the second active material may be a carbon material, such as crystalline carbon, amorphous carbon, a carbon compound, and a carbon fiber, a Li metal, or a Li alloy.

The separator 113 may be a porous polymer membrane, such as a polyethylene (PE) layer and a polypropylene (PP) layer. The separator 113 may further include ceramic particles, and may be formed of a solid polyelectrolyte. The separator 113 may be formed as an independent film, or may be formed as a nonconductive porous layer on the first electrode plate 111 or the second electrode plate 112.

A first electrode tab 114 is electrically connected with the first electrode plate 111, and a second electrode tab 115 is electrically connected with the second electrode plate 112. One end of the first electrode tab 114 may be connected with the first non-coated portion by welding, etc., and another end of the first electrode tab 114 may be electrically connected with the current interrupt portion 150. Also, one end of the second electrode tab 115 may be connected with the second non-coated portion by welding, etc., and another end of the second electrode tab 115 may be welded to a bottom surface of the can 140.

The can 140 includes an opening at one side thereof, and the electrode assembly 110 may be contained in the can 140 through the opening. The can 140 may have for example a cylindrical shape. The can 140 may be formed of a conductive material such as Al, and thus, may protect the electrode assembly 110 from external shocks and function as a heat insulating board that releases heat accompanied in charge and discharge operations of the electrode assembly 110 to the outside. In addition, since the bottom surface of the can 140 is electrically connected with the second electrode tab 115 by welding, etc., the can 140 may function as a second electrode.

A lower safety vent 146 may be formed in the bottom surface of the can 140. When an internal pressure of the can 140 exceeds a predetermined value, the lower safety vent 146 may be transformed or may break and thus may emit gas generated inside the can 140 to the outside.

A first insulating plate 120 and a second insulating plate 130 may be respectively located on a first end and a second end of the electrode assembly 110, inside the can 140. The first insulating plate 120 may be disposed between an upper surface of the electrode assembly 110 and the cap assembly 170, thereby insulating the electrode assembly 110 from the cap assembly 170. The second insulating plate 130 may be disposed between the electrode assembly 110 and the bottom surface of the can 140, thereby insulating the electrode assembly 110 from the can 140.

The cap assembly 170 is combined with the can 140 and seals the opening of the can 140. In detail, a beading portion 142 bent toward the inside of the can 140 is formed in the can 140. The cap assembly 170 is inserted inside the can 140 on the beading portion 142, and a portion of the can 140 is bent toward the inside thereof above the cap assembly 170 to form a crimping portion 144. Thus, the cap assembly 170 is combined with the can 140. The beading portion 142 and the crimping portion 144 solidly fix and support the cap assembly 170 to the can 140, thereby preventing a dislocation of the cap assembly 170 and a leakage of an electrolyte to the outside.

Such a cap assembly 170 may include a gasket 141, a current interrupt portion 150, and a cap-up 160.

The gasket 141 is located at one side of the can 140 in an approximately ring shape. The gasket 141 fixes the current interrupt portion 150 and the cap-up 160 according to a shape of the crimping portion 144, and insulates the current interrupt portion 150 and the cap-up 160 from the can 140. In one embodiment, as illustrated in FIG. 3, the cap-up 160 is located on the current interrupt portion 150, and the cap-up 160 and the current interrupt portion 150 are fixed by the gasket 141. However, embodiments of the present invention are not limited thereto. In other words, an edge of the current interrupt portion 150 may extend to the outside, and the extending edge of the current interrupt portion 150 may be bent so as to cover an edge of an upper portion of the cap-up 160 so that the current interrupt portion 150 and the cap-up 160 may be combined with each other. In this state, the current interrupt portion 150 and the cap-up 160 may be further fixed by the gasket 141.

The current interrupt portion 150 may block a current when a pressure inside the can 140 rises, and may emit gas to the outside when the internal pressure of the can 140 exceeds a predetermined value by including a safety vent 155 (hereinafter, referred to as "an upper safety vent"). Also, the current interrupt portion 150 may include at least one hole 153 (FIG. 3) through which gas may flow in a direction toward the cap-up 160 under the upper safety vent 155. The hole 153 may have a size such that the gas may evenly diffuse in up and down directions inside the can 140 and both the upper safety vent 155 and the lower safety vent 146 may be fractured at about the same time.

For example, an overall area of the hole 153 may be formed to be about 0.12% to about 1.61% of a cross-sectional area of the can 140 based on an inner diameter D of the can 140. The inner diameter D of the can 140 may have the same size as an outer diameter of the gasket 141. In other words, the overall area of the hole 153 may be formed to be about 0.12% to about 1.61% of a cross-sectional area of the gasket 141 based on the outer diameter of the gasket 141.

When the overall area of the hole 153 is smaller than 0.12% of the cross-sectional area of the can 140 based on the inner diameter D of the can 140, it is difficult for sufficient gas to flow through the hole 153 and be released to the outside, and thus, the cap assembly 170 may be separated from the can 140 when there is an increase in the internal pressure of the can 140.

On the contrary, when the overall area of the hole 153 is larger than 1.61% of the cross-sectional area of the can 140 based on the inner diameter D of the can 140, the gas is excessively released through an upper portion of the can 140, and thus, the gas may not evenly diffuse in up and down directions inside the can 140. Thus, the lower safety vent 146 may not operate, and the upper portion of the can 140 may melt by heat or a side surface of the can 140 may break by explosion. In this case, the side surface of the can 140 may fracture because the lower safety vent 146 is not fractured, and other secondary batteries located next to the secondary battery 100 may explode in series.

FIGS. 4 and 5 illustrate an example of the current interrupt portion 150. Referring to FIGS. 4 and 5, the current interrupt portion 150 may include, for example, a cap-down 152, a vent portion 154, an insulator 156, and a sub-disk 158.

The cap-down 152 includes an opening in the center thereof, and the vent portion 154 is located on a surface of the cap-down 152. The cap-down 152 may include a first lower plate 152b that is molded, a first upper plate 152a that is molded and spaced from the first lower plate 152b, and a plurality of first bridge portions 152c connecting the first lower plate 152b and the first upper plate 152a. An empty space 157 may be formed between the plurality of first bridge portions 152c that are adjacent to each other.

The insulator 156 may be formed in an edge between the cap-down 152 and the vent portion 154, and thus, the cap-down 152 and the vent portion 154 are insulated from each other, and the empty space 157 between the plurality of firsts bridge portions 152c may be sealed by the insulator 156. Also, a gap may be formed between the cap-down 152 and the vent portion 154 by the insulator 156.

The vent portion 154 may include an upper safety vent 155. The upper safety vent 155 has a groove shape, and thus, may be formed such that at least a portion thereof is fractured when an external pressure is applied thereon. Thus, when an internal pressure of the can 140 exceeds a predetermined value, the upper safety vent 155 is changed or may fracture to emit gas inside the can to the outside.

In one embodiment, at least one hole 153 may be formed in the cap-down 152. Although FIG. 4 illustrates an example in which two holes 153 are formed in the cap-down 152, the present invention is not limited thereto.

The overall area of the holes 153 may be formed to be about 0.12% to about 1.61% of the cross-sectional area of the can 140 based on the inner diameter (D of FIG. 3) of the can 140. Thus, gas may evenly diffuse in up and down directions in the can 140 so that both the upper safety vent 155 and the lower safety vent 146 may be fractured.

The sub-disk 158 is located on the other surface of the cap-down 152 to cover the opening. One surface of the sub-disk 158 may be combined to the first electrode tab 114, and other surface of the sub-disk 158 may be electrically connected with the vent portion 154 in the opening of the cap-down 152 by ultrasonic welding, etc.

Hereinafter, an operation of the current interrupt portion 150 will be described in detail by referring to FIGS. 5 and 3 together.

The secondary battery 100 may be overheated by rapid heating and overcharging. During the heating of the secondary battery 100, gas may be generated by cyclohexylbenzene (CHB) and biphenyl (BP), which are electrolyte additives. As a result, an internal pressure of the can 140 rapidly increases, and there is a possibility that the secondary battery 100 may explode.

As illustrated in FIG. 5, when the gas is generated inside the can 140, the gas may diffuse through the holes 153 and a pressure in the gap between the cap-down 152 and the vent portion 154 may increase. As a result, a shape of the vent portion 154 changes so that a combining portion P1 between the cap-down 152 and the sub-disk 158 may be dislocated and currents may be blocked. Also, the insulator 156 may be fused when a temperature inside the can 140 rises, and the gas may flow into the gap between the cap-down 152 and the vent portion 154 through the empty space 157 between the plurality of first bridge portions 152c sealed by the insulator 156.

When the pressure in the gap between the cap-down 152 and the vent portion 154 further increases, the upper safety vent 155 may be fractured so that the gas inside the can 140 may be released to the outside. As the lower safety vent 146 too is necessary to fracture with the upper safety vent 155, the overall area of the holes 153 may be formed to be about 0.12% to about 1.61% of the cross-sectional area of the can 140 based on the inner diameter D of the can 140.

Table 1 below is a result of testing the stability of the secondary battery 100 according to overall areas of the holes 153. Hereinafter, each of a first embodiment through a third comparative embodiment shows results of observing the outlooks of 20 secondary batteries 100 after forcibly igniting the secondary batteries 100 by exposing the secondary batteries 100 to a radiant heat of about 600° C., and allowing the secondary batteries 100 to burn completely. Also, in Table 1 below, the inner diameter D of the can 140 is about 17.78 mm, the overall areas of the holes 153 of the $1^{st}$ embodiment through the $4^{th}$ embodiment are about 0.3 mm$^2$, 0.6 mm$^2$, 1.3 mm$^2$, and 2.0 mm$^2$, respectively, and the overall areas of the holes 153 of the $2^{nd}$ comparative embodiment and the $3^{rd}$ comparative embodiment are about 6.0 mm$^2$ and 10.0 mm$^2$, respectively.

|  | Overall area of the holes/ Cross-sectional area based on the inner diameter of the can (%) | Number of holes | Side surface explosion of the can | Whether the lower safety vent operates | Separation of the cap assembly |
| --- | --- | --- | --- | --- | --- |
| 1st embodiment | 0.12 | 2 | 0% | 100% | 0% |
| 2nd embodiment | 0.24 | 3 | 0% | 100% | 0% |
|  |  | 5 | 0% | 100% | 0% |
| 3rd embodiment | 0.52 | 2 | 0% | 100% | 0% |
| 4th embodiment | 0.8 | 3 | 0% | 100% | 0% |
|  |  | 5 | 0% | 100% | 0% |
| 5th embodiment | 1.61 | 3 | 0% | 100% | 0% |
| 1st comparative embodiment | 0 | 0 | 0% | 100% | 8% |
| 2nd comparative embodiment | 2.4 | 3 | 0% | 60% | 0% |

-continued

| | Overall area of the holes/ Cross-sectional area based on the inner diameter of the can (%) | Number of holes | Side surface explosion of the can | Whether the lower safety vent operates | Separation of the cap assembly |
|---|---|---|---|---|---|
| 3rd comparative embodiment | 4 | 3 | 20% | 80% | 0% |

As shown in Table 1, the 1$^{st}$ through 4$^{th}$ embodiments illustrate a case in which the overall areas of the holes 153 are about 0.12% through about 1.61% of the cross-sectional area of the can 140 based on the inner diameter D of the can 140. In this case, during the ignition of the secondary battery 100, gas evenly diffuses in up and down directions inside the can 140, and the gas is stably released through the lower safety vent 146.

On the contrary, in the 2$^{nd}$ comparative embodiment, in 40% of the 20 secondary batteries 100, gas was not released through the lower safety vent 146. In the 3$^{rd}$ comparative embodiment, in 20% of the 20 secondary batteries 100, gas was not released through the lower safety vent 146, and, in other 20% of the 20 secondary batteries, a side surface of the can 140 exploded.

In the cases of the 2$^{nd}$ and 3$^{rd}$ comparative embodiments, as the overall areas of the holes 153 are larger than 1.61% of the cross-sectional area of the can 140 based on the inner diameter D of the can 140, gas did not evenly diffuse in up and down directions in the can 140, and as the gas concentrated toward an upper portion of the can 140, the lower safety vent 146 did not operate. Particularly, in the case of the 3$^{rd}$ comparative embodiment, the side surface of the can 140 exploded because even more gas was instantly released through the upper safety vent 155.

In the case of the 1$^{st}$ comparative embodiment, the lower safety vent 146 was stably fractured, but it was difficult for the gas to be released through the upper safety vent 155. Thus, the cap assembly 170 was separated from the can 140 due to an increase in an internal pressure of the can 140.

Accordingly, it is desirable that the overall area of the holes 153 is about 0.12% to about 1.6% of the cross-sectional area of the can 140 based on the inner diameter D of the can 140 so that the upper safety vent 155 and the lower safety vent 146 are fractured together when the internal pressure of the can 140 increases, consequently improving the stability of the secondary battery 100.

As shown in the 2$^{nd}$ and 4$^{th}$ embodiments, when the overall areas of the holes 153 are the same, the number of the holes 153 may vary. In other words, when the overall area of the holes 153 satisfies the above condition, the number of the holes 153 may vary. For example, the holes 153 may number from 2 to 6, but it is not limited thereto.

The hole 153 may have a circular shape. Also, when a plurality of holes 153 are formed in the cap-down 152, each of the plurality of holes 153 may be circular. Also, the plurality of holes 153 may be arranged in a radial shape, each of the holes 153 being at the same distance apart from the center of the cap-down 152, and distances between two holes 153 that are adjacent to each other may be the same.

For example, the current interrupt portion 150 of FIG. 4 shows a case in which two holes 153 are formed in the cap-down 152, wherein the holes 153 are formed at asymmetrical locations with respect to each other based on the center of the cap-down 152. Also, a current interrupt portion 150' of FIG. 6 illustrates an example in which three holes 153 are formed in the cap-down 152, and in this case, the holes 153 may be respectively formed at a location corresponding to a vertex of an equilateral triangle.

Referring again to FIG. 2, the cap-up 160 may function as a first electrode by being connected with the current interrupt portion 150 electrically connected with the first electrode tab 114. The cap-up 160 may include a second lower plate 161, a second upper plate 163, and a plurality of second bridge portions 162 connecting the second lower plate 161 and the second upper plate 163.

A plurality of through-holes 164 are formed between the plurality of second bridge portions 162 to ease gas emission, and a notch may be formed in connecting portions of the plurality of second bridge portions 162, connected with the second lower plate 161 and the second upper plate 163. Thus, when gas is emitted, the connecting portions break due to gas pressure, and thus, the second upper plate 163 is dislocated and the gas may be more smoothly released to the outside.

Figure 7:
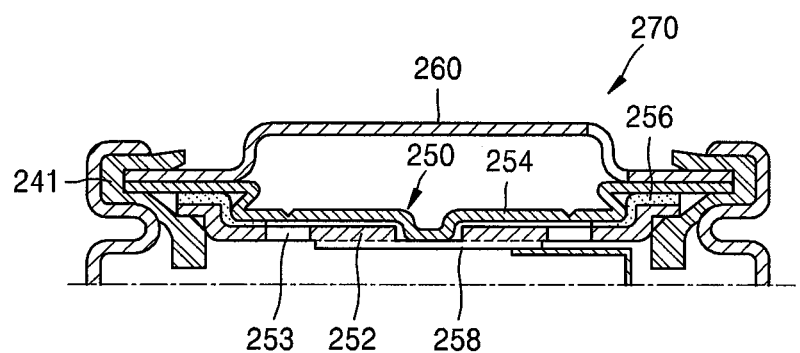
FIG. 7 is a schematic cross-sectional view of another example of a cap assembly of a secondary battery of FIG. 3.

FIG. 7 is a schematic cross-sectional view of another example of the cap assembly of the secondary battery 100 of FIG. 3.

Referring to FIG. 7, the cap assembly 270 may include a current interrupt portion 250, a cap-up 260 electrically connected with the current interrupt portion 250, and a gasket 241 fixing the current interrupt portion 250 and the cap-up 260. The gasket 241 and the cap-up 260 are identical with the gasket 141 and the cap-up 160 illustrated and described with reference to FIGS. 1 through 5.

The current interrupt portion 250 may, for example, include a cap-down 252, a vent portion 254, an insulator 256, and a sub-disk 258.

The cap-down 252 may include at least one hole 253, and an overall area of the hole 253 may be formed to be about 0.12% through about 1.61% of a cross-sectional area of the gasket 241 based on an outer diameter of the gasket 241.

The insulator 256 is located in an edge between the cap-down 252 and the vent portion 254, and by this, a gap may be formed between the cap-down 252 and the vent portion 254.

The sub-disk 258 is electrically connected with the vent portion 254. The sub-disk 258 may be integrally formed with the cap-down 252, or may protrude from a surface of the cap-down 252 for ease of attachment with the electrode tab. However, embodiments of the present invention are not limited thereto and the sub-disk 258 may not protrude from the surface of the cap-down 252, and may be integrally formed with the cap-down 252.

Figure 8:
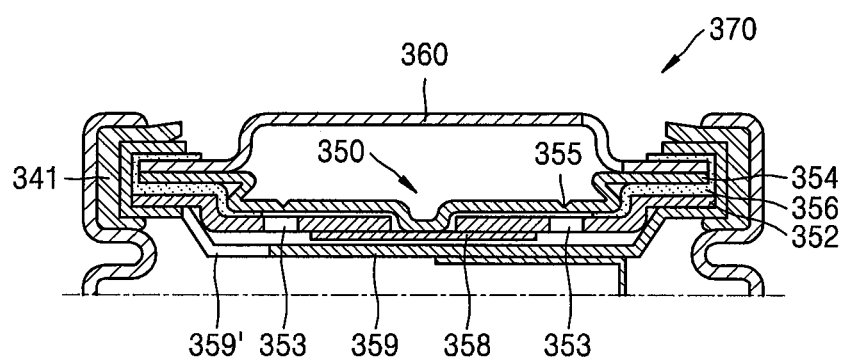
FIG. 8 is a schematic cross-sectional view of another example of a cap assembly of a secondary battery of FIG. 3.

FIG. 8 is a schematic cross-sectional view of another example of the cap assembly of the secondary battery 100 of FIG. 3.

Referring to FIG. 8, a cap assembly 370 may include a current interrupt portion 350, a cap-up 360 electrically connected with the current interrupt portion 350, and a gasket 341 fixing the current interrupt portion 350 and the cap-up 360. The gasket 341 and the cap-up 360 are respectively identical with the gasket 141 and the cap-up 160 illustrated and described with reference to FIGS. 1 through 5.

The current interrupt portion 350 may, for example, include a cap-down 352, a vent portion 354, an insulator 356, a sub-disk 358, and a cover plate 359.

The vent portion 354 may include an upper safety vent 355 of which shape may change or which may break to emit gas to the outside when an internal pressure of the can 140 exceeds a predetermined value.

The cap-down 352 includes at least one hole 353, and an overall area of the hole 353 may be formed to be about 0.12% through about 1.61% of a cross-sectional area of the gasket 341 based on an outer diameter of the gasket 341.

The cap-down 352 may include an opening in the center thereof, and the sub-disk 358 may be electrically connected with the vent portion 354 in a location covering the opening. In one embodiment, the sub-disk 358 may be integrally formed with the cap-down 352 as illustrated in FIG. 7.

The insulator 356 is located in an edge between the cap-down 352 and the vent portion 354, and as such, a gap may be formed between the cap-down 352 and the vent portion 354. Also, the insulator 356 may extend and be bent towards the outside, thereby covering up the outside edge of the current interrupt portion 350.

The cover plate 359 may be electrically connected with the cap-down 352, and may be formed to cover up the insulator 356. The cover plate 359 may be covered up by the gasket 341. A fluid hole 359' through which gas flows in a direction toward the cap-up 360 may be formed in the cover plate 359. For example, an area of the fluid hole 359' may be formed to be 10 mm² or less, but it is not limited thereto.

As described above, according to the one or more of the above embodiments of the present invention, the stability of the secondary battery may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A secondary battery comprising an electrode assembly; an electrode tab extending from the electrode assembly; a can containing the electrode assembly, the can having an open side and a bottom surface opposite to the open side, the bottom surface having a lower safety vent configured to open at a predetermined pressure; and a cap assembly coupled to the can, wherein the cap assembly comprises:
a current interrupt portion;
a cap-up electrically connected with the current interrupt portion; and
a gasket fixing the current interrupt portion and the cap-up,
wherein the current interrupt portion comprises:
a vent portion comprising an upper safety vent configured to open at the predetermined pressure,
a cap-down comprising at least one hole configured to allow gas generated inside the can to flow in a direction toward the cap-up,
a sub-disk under the cap-down, wherein the cap-down is located between the sub-disk and the vent portion and wherein both the vent portion and the cap-down directly contact the sub-disk; and
a cover plate under the cap-down and the sub-disk, wherein the cover plate is directly coupled to the electrode tab and to the cap-down, wherein the cover plate comprises a fluid hole through which gas flows in a direction toward the cap-up,
wherein a combined area of the at least one hole and any additional holes on the cap-down is between about 0.12% to about 1.61% of a cross-sectional area of the can based on an inner diameter of the can such that gas within the can is diffused evenly towards both the upper and lower safety vents.

2. The secondary battery of 1, wherein the cap-down comprises an opening in a center thereof;
wherein the sub-disk covers the opening in the cap-down; and
wherein the sub-disk and the vent portion are electrically connected with each other via the opening.

3. The secondary battery of claim 1, further comprising an insulator in an edge between the cap-down and the vent portion, and wherein the cap-down comprises:
a first lower plate;
a first upper plate spaced from the first lower plate; and
a plurality of first bridge portions connecting the first lower plate and the first upper plate; wherein spaces between the plurality of first bridge portions that are adjacent to each other are sealed by the insulator.

4. The secondary battery of claim 1, wherein the cap-down comprises a plurality of holes arranged in a radial shape, each of the holes being at the same distance apart from a center of the cap-down.

5. The secondary battery of claim 4, wherein distances between two holes that are adjacent to each other among the plurality of holes are the same.

6. The secondary battery of claim 1, wherein the cap-down comprises two to six holes.

7. The secondary battery of claim 1, further comprising an insulator between the cap-down and the vent portion, wherein the cover plate extends towards outside and is bent to cover outside edges of the cap-down and the vent portion.

8. The secondary battery of claim 1, wherein the cap-up comprises a second lower plate, a second upper plate, and a plurality of second bridge portions connecting the second lower plate and the second upper plate; and
wherein a notch is formed in connecting portions of the plurality of second bridge portions connecting the second bridge portions with the second lower plate and the second upper plate.

9. The secondary battery of claim 1, wherein the upper safety vent and the lower safety vent are fractured together when an internal pressure of the can exceeds a predetermined value.

10. The secondary battery of claim 1, wherein the electrode assembly has a jelly-roll shape and comprises a first electrode plate, a second electrode plate, and a separator between the first electrode plate and the second electrode plate;
wherein the electrode assembly has a hollow in a center thereof;

wherein the first electrode plate is electrically connected with the current interrupt portion and a first electrode tab; and wherein the second electrode plate is electrically connected with the can by a second electrode tab.

* * * * *